US012574547B2

(12) United States Patent
Moon

(10) Patent No.: US 12,574,547 B2
(45) Date of Patent: Mar. 10, 2026

(54) VIDEO DIVERSIFICATION DEVICE, VIDEO SERVICE SYSTEM HAVING THE SAME, AND OPERATING METHOD THEREOF

(71) Applicant: SAMSUNG ELECTRONICS CO., LTD., Suwon-si (KR)

(72) Inventor: Sungho Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 18/496,995

(22) Filed: Oct. 30, 2023

(65) Prior Publication Data

US 2024/0223798 A1 Jul. 4, 2024

(30) Foreign Application Priority Data

Jan. 4, 2023 (KR) ........................ 10-2023-0001034

(51) Int. Cl.
*H04N 19/59* (2014.01)
*G06T 3/40* (2024.01)

(52) U.S. Cl.
CPC .............. *H04N 19/59* (2014.11); *G06T 3/40* (2013.01)

(58) Field of Classification Search
CPC .................................. H04N 19/59; G06T 3/40
See application file for complete search history.

(56) References Cited

U.S. PATENT DOCUMENTS

| | | | | |
|---|---|---|---|---|
| 5,253,055 A | * | 10/1993 | Civanlar | .............. H04N 21/434 |
| | | | | 375/E7.091 |
| 9,584,573 B2 | | 2/2017 | Phillips et al. | |
| 9,917,872 B2 | | 3/2018 | Wang et al. | |
| 10,848,803 B2 | | 11/2020 | Hasek | |
| 11,095,939 B2 | | 8/2021 | Kwon et al. | |
| 11,109,048 B2 | | 8/2021 | Newman et al. | |
| 2009/0296822 A1 | * | 12/2009 | Sandeep | ................ H04N 19/61 |
| | | | | 375/E7.243 |
| 2016/0100213 A1 | * | 4/2016 | Song | ...................... H04N 21/84 |
| | | | | 725/54 |
| 2016/0227228 A1 | | 8/2016 | Pomeroy et al. | |
| 2018/0007362 A1 | * | 1/2018 | Krishnan | .............. H04N 19/59 |
| 2018/0063218 A1 | | 3/2018 | Kim et al. | |
| 2020/0213605 A1 | * | 7/2020 | Wenger | .................. H04N 19/70 |
| 2021/0329340 A1 | | 10/2021 | Jeon et al. | |
| 2022/0070493 A1 | | 3/2022 | Mammou et al. | |
| 2022/0198607 A1 | * | 6/2022 | Chen | .................... G06T 3/4046 |
| 2022/0206076 A1 | | 6/2022 | Morrison | |

FOREIGN PATENT DOCUMENTS

| | | |
|---|---|---|
| KR | 10-2002-0043833 | 6/2002 |
| KR | 10-2006-0103681 | 10/2006 |
| KR | 10-2018-0021997 | 3/2018 |
| KR | 10-2142458 | 8/2020 |
| KR | 10-2021-0128091 | 10/2021 |

* cited by examiner

*Primary Examiner* — Zaihan Jiang
(74) *Attorney, Agent, or Firm* — Morgan, Lewis & Bockius LLP

(57) ABSTRACT

A video diversification device includes a capture unit configured to capture each image of a video being played; a scaler configured to scale each captured image into an image with a first resolution; and an encoder configured to convert the scaled image into a plurality of encoding sources with different resolutions in a time-sharing manner.

15 Claims, 11 Drawing Sheets

500

400

500

600

1100

Encode video by timing sharing — S110

Determine network environment/
decoding capacity — S120

Provide adaptive streaming to
target device — S130

VIDEO DIVERSIFICATION DEVICE, VIDEO SERVICE SYSTEM HAVING THE SAME, AND OPERATING METHOD THEREOF

CROSS-REFERENCE TO RELATED APPLICATION(S)

This application claims priority under 35 U.S.C. § 119 to Korean Patent Application No. 10-2023-0001034, filed on Jan. 4, 2023 in the Korean Intellectual Property Office, the disclosure of which is incorporated by reference in its entirety.

FIELD

The present inventive concept relates to a video diversification device, a video service system, and an operating method thereof.

DISCUSSION

In general, streaming services that may be used in a video-on-demand (VOD) service or an audio-on-demand (AOD) service, in terminals providing such services, use a technique of reproducing pertinent files in real-time, such as a video file and/or an audio file, while downloading the files from a server. This is generally performed rather than reproducing the files after downloading all of the pertinent files from the server. The video streaming service typically uses HyperText Transfer Protocol (HTTP) Adaptive Streaming (HAS) technology. The HAS technology is a technology that transmits video data fragments in small blocks, reconfigures video fragments according to image quality, and transmits the reconfigured video fragments according to a CPU condition and bandwidth environment of one or more client terminals to adequately ensure quality and/or security of the video.

SUMMARY

An embodiment of the present inventive concept may include a video diversification device providing adaptive streaming according to the network environment and/or device characteristics, a video service system including the same, and an operating method thereof.

According to an embodiment of the present inventive concept, a video diversification device includes a capture unit configured to capture each image of a video being played; a scaler configured to scale each captured image into an image with a first resolution; and an encoder configured to convert the scaled image into multiple encoding sources with different resolutions in a time-sharing manner.

According to an embodiment of the present inventive concept, an operating method of a video diversification device includes encoding video into multiple encoding sources with different resolutions in a time-sharing manner; determining the network environment with a target device or decoding performance of the target device; and providing adaptive streaming with one of the encoding sources to the target device according to the network environment or the decoding performance.

According to an embodiment of the present inventive concept, a video service system includes: at least one target device; and a video diversification device providing adaptive streaming to the at least one target device according to at at least one of a network environment or a decoding performance of the at least one target device, wherein the video diversification device includes an encoder encoding an original source into multiple encoding sources with different resolutions in a time-sharing manner.

BRIEF DESCRIPTION OF THE DRAWINGS

The above and other embodiments of the present inventive concept may be more clearly understood from the following detailed description when taken in conjunction with the accompanying drawings, in which.

DETAILED DESCRIPTION

Figure 1:
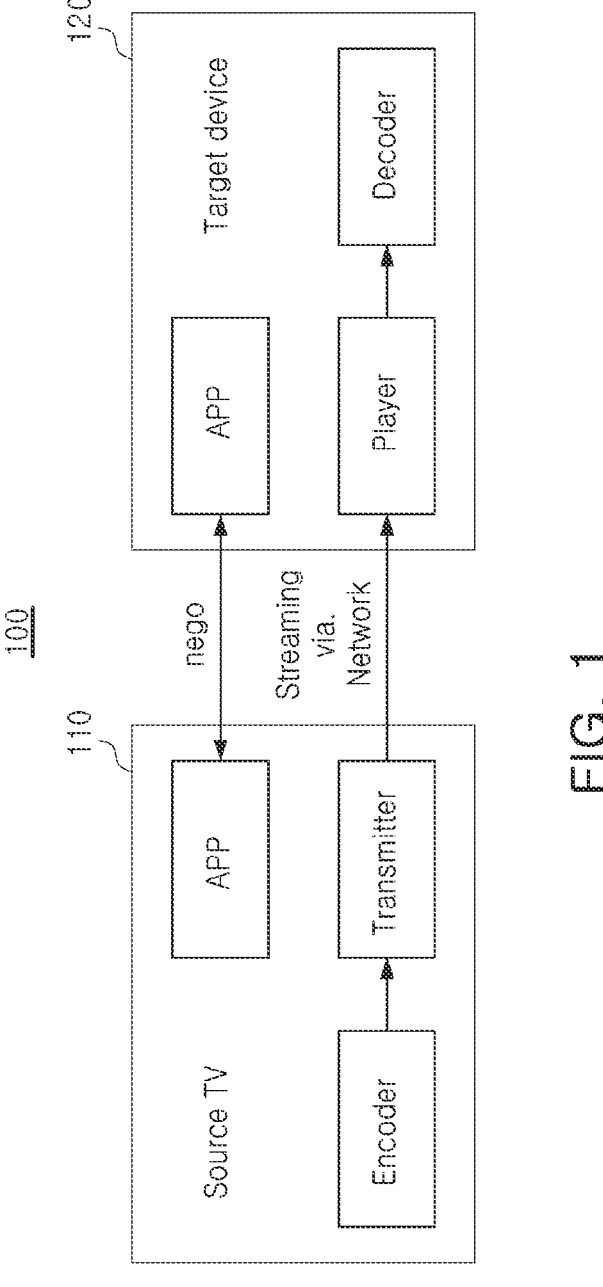
FIG. 1 is a block diagram illustrating a video service system.

Hereinafter, illustrative non-limiting embodiments of the present inventive concept will be described with reference to the accompanying drawings.

In the following, the present inventive concept will be described by way of example, clearly and in sufficient detail for a person skilled in the art to practice the invention.

According to an embodiment of the present inventive concept, a video diversification device, a video service system having the same, and an operating method thereof may provide adaptive streaming using a time-sharing hardware encoder of a television (TV). The video diversification device, the video service system including the video diversification device, and the operating method thereof may perform real-time hardware encoding, multi-instance encoding for a source, adaptive streaming, and/or stream casting. According to an embodiment of the present inventive concept, the video diversification device, the video service system, and the operating method thereof may perform multi-instance encoding on an image displayed on a TV to provide an adaptive streaming service with real-time functionality based on the particular device characteristics and/or network environment.

According to an embodiment of the present inventive concept, the video diversification device, the video service system, and the operating method thereof may capture the largest image displayed on a TV, encode the captured screen into a video with various resolutions, and provide an adaptive streaming service based on the particular device characteristics and/or network environment.

According to an embodiment of the present inventive concept, the video diversification device, the video service system, and the operating method thereof may provide mirroring, casting, and/or video call functions with various resolutions for one source based on the particular device characteristics and/or network environment.

In addition, the video diversification device, the video service system including the video diversification device, and the operating method thereof according to an embodiment of the present inventive concept may provide an adaptive streaming service suitable for each respective environment of multiple devices although encoding is performed with one TV source.

A video diversification device may capture a TV screen image for mirroring, casting, and/or video call by a user to another device, encode a captured image, and transmit encoded data to another device. Such a video diversification device targets another device to receive, and encodes a TV source according to the performance and/or the network environment of the receiving device. For example, if a counterpart device is able to decode only Full-High-Definition (FHD) sources, a source TV need not encode to Ultra High-Definition (UHD), which is high resolution, and may instead encode to FHD and transmit the same to the counterpart device. In addition, the source TV may transmit data at a high bitrate when the network condition is relatively high, and at a low bitrate otherwise, depending on the network connection status with the counterpart device, for example.

FIG. 1 illustrates a video service system 100. Referring to FIG. 1, the video service system 100 includes a video diversification device 110 and a target device 120.

Referring to FIG. 1, a screen of the video diversification device 110, that is, a source TV, may be transmitted to the target device 120 through 1:1 negotiation between the video diversification device 110 transmitting an image and the target device 120 receiving the image.

Such a transmission technique is transmission suitable for 1:1 purposes. If there are several target devices (e.g., two target devices), a first target device may decode up to UHD, and the second target device may decode up to FHD. In order to stream to the two target devices, the source TV may stream in FHD tailored to the target device with the lowest performance, among the target devices. In addition, regardless of network environment of the two target devices, streaming is performed according to the network environment with the lowest performance.

Figure 2:
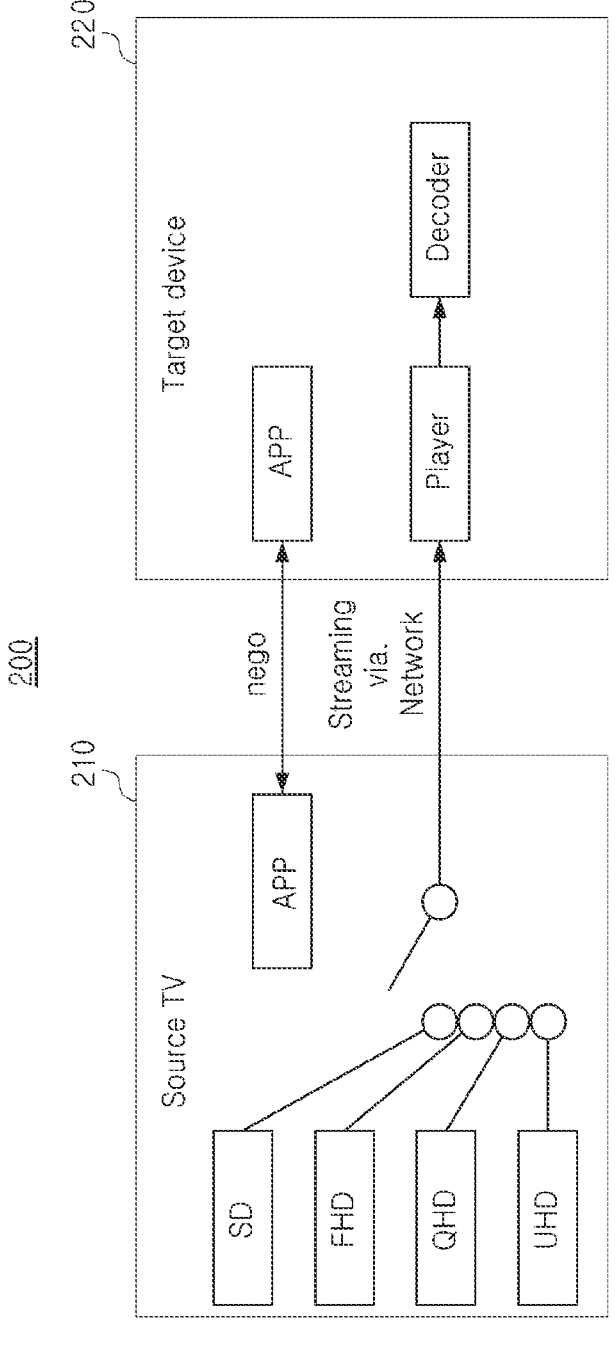
FIG. 2 is a block diagram illustrating a video service system.

FIG. 2 illustrates a video service system 200. Referring to FIG. 2, the video service system 200 includes a source TV 210 and a target device 220. The source TV 210 may satisfy the performance of various devices, and encodes in various resolutions or bit rates suitable for various network environments. As shown in FIG. 2, the source TV 210 may encode and transmit the same source in various resolutions in real-time to suit various target devices. For example, according to the network environment of the source TV 210 and the target device 220, the source TV 210 transmits in a higher resolution, potentially with the highest bit rate, when the network environment is of relatively high quality, and transmits in a lower resolution when the network environment is of relatively low quality. In addition, streaming of the source TV 210 may vary according to decoding performance and/or capacitance of the target device 220.

The streaming method described above is provided by various Over-The-Top (OTT) media services offered directly to viewers via the Internet, such as by Netflix, YouTube, Amazon, and the like. These video providing services are databased in a pre-encoded form in corresponding OTT service servers, rather than real-time casting. The video diversification device provides a streaming service according to the situation of the target device. Faster encoding is used for real-time adaptive streaming or casting, and encoding with various resolutions for a source is performed.

A video diversification device according to an illustrative embodiment of the present inventive concept may encode videos of various resolutions using time-sharing of a hardware encoder in a TV, and provide a streaming service to a target device.

Figure 3:
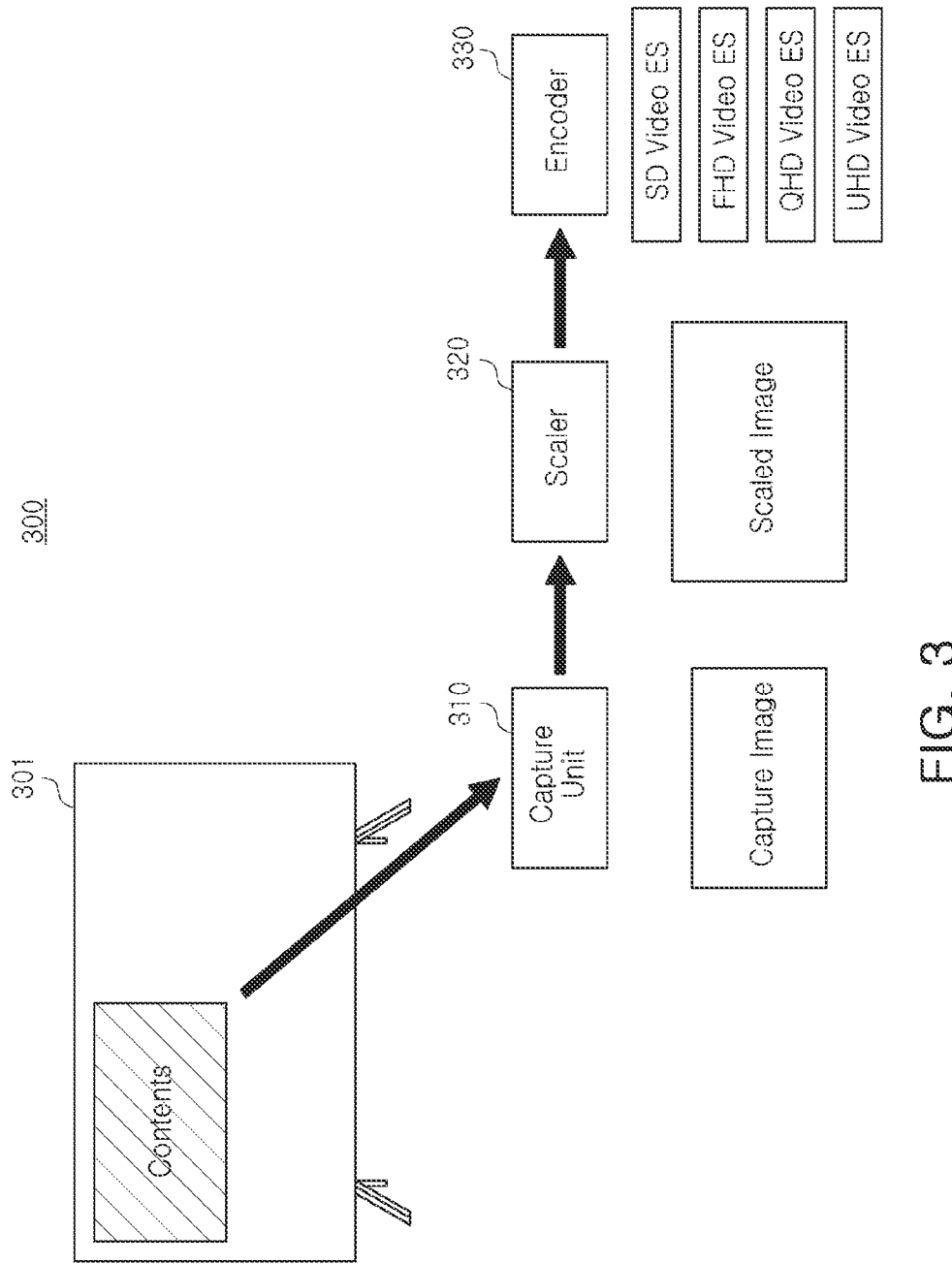
FIG. 3 is a block diagram illustrating a video diversification device according to an embodiment of the present inventive concept.

FIG. 3 is a view illustrating a video diversification device 301 according to an embodiment of the present inventive concept. Referring to FIG. 3, the video diversification device 301 may include an capture unit 310, a scaler 320, and an encoder 330. Here, a video played by the video diversification device 301 may be any video, such as a Digital Television (DTV) video, an OTT playback video, an external input or a camera video through a webcam.

The capture unit 310 may be implemented to capture a screen being played and store the captured image. In an embodiment, the capture unit 310 may be implemented in hardware, software, or firmware.

The scaler 320 may scale the captured image to a maximum resolution that the encoder 330 may process. In an embodiment, the scaler 320 may be implemented in hardware, software, or firmware. Here, the scaler 320 does not scale the captured image to source images having various resolutions in order to encode videos having various resolutions. In an embodiment, the scaler 320 may scale the captured image to a maximum resolution (e.g., UHD) that the encoder 330 may process. In an embodiment, the scaler 320 may scale the captured image to an image with a first resolution (e.g., an Ultra High-Definition resolution).

The encoder 330 may be implemented to receive a scaled image from the scaler 320 and output multiple encoded images Standard-Definition (SD), Full-High-Definition (FHD), Quad-High-Definition (QHD), Ultra High-Definition (UHD), and the like, using a time-sharing scheme. The encoder 330 may perform encoding for a scaled-down image as well as encoding for an original resolution. The encoder 330 may convert the scaled image into encoding sources with different resolutions in a time-sharing manner. Here, the different resolutions may include at least two of UHD, quad-High-Definition (QHD), full-High-Definition (FHD),- High-Definition (HD), and Standard-Definition (SD).

In an embodiment, the time-sharing manner or scheme may include converting the image into the first resolution in a first of multiple time slots, and converting the image into each different resolution in each other of the plurality of time slots, respectively. In an embodiment, the time-sharing manner or scheme may include converting the image into the first resolution in a first plurality of time slots, and converting the image into each different successively decreasing resolution in a successively decreasing plurality of time slots, respectively.

In an embodiment, the encoder 330 may sub-sample and encode the scaled image to convert the image into an encoding source having a second resolution (e.g., QHD) lower than the first resolution. In an embodiment, the encoder 330 may down-sample the sub-sampled image to convert the image into an encoding source having a third resolution (e.g., FHD) lower than the second resolution. In an embodiment, the video diversification device 301 may further include a buffer memory storing the sub-sampled image. In an embodiment, the encoder 330 may filter pixel values of the scaled image and convert the scaled image into an encoding source having the second resolution lower than the first resolution. Here, the time-sharing manner may sequentially perform encoding in order of high resolution. In an embodiment, the video diversification device 301 may further include a buffer memory storing each of the sources encoded by the encoder 330 in a stream format.

In addition, the video diversification device 301 according to an embodiment of the present inventive concept may provide adaptive streaming to the target device using one of encoding sources converted according to the network environment with the target device or decoding performance of the target device. For example, the video diversification device 301 may provide adaptive streaming with one of the converted encoding sources in response to a service resolution request to the target device.

Figure 4:
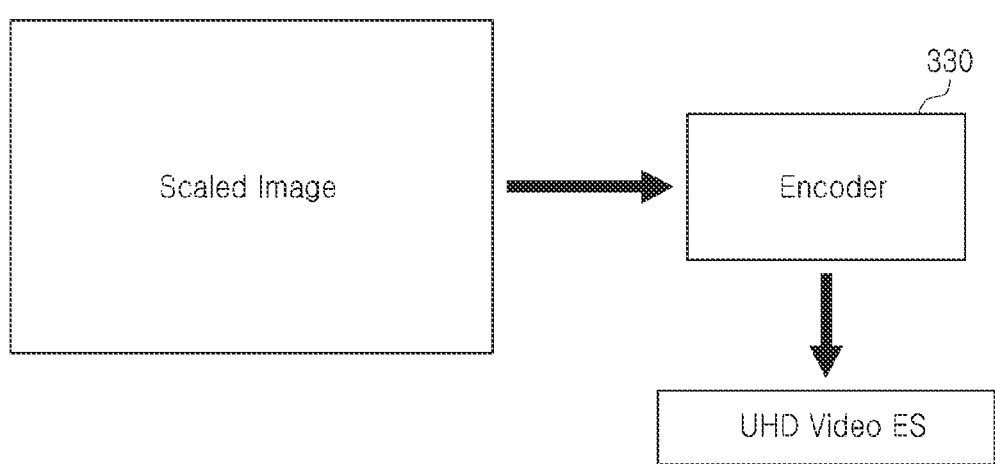
FIG. 4 is a block diagram illustrating first encoding of an encoder according to an embodiment of the present inventive concept.

FIG. 4 illustrates an encoding 400 of the encoder 330 according to an embodiment of the present inventive concept. Referring to FIG. 4, it is assumed that a video encoding source is generated by encoding one UHD source image to have four resolutions. At this time, in the encoding 400 of the encoder 330, the original UHD source image as it is may be encoded as a frame having an Ultra High-Definition (UHD) resolution of 3840×2160 pixels.

Figure 5:
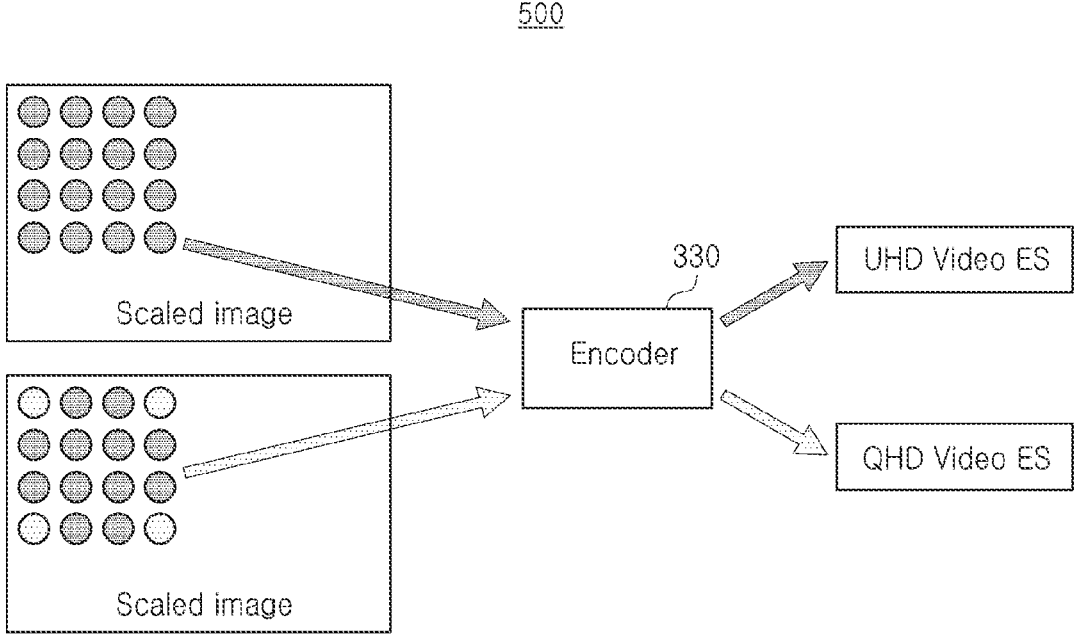
FIG. 5 is a block diagram illustrating second encoding of an encoder according to an embodiment of the present inventive concept.

FIG. 5 illustrates an encoding 500 by the encoder 330 according to an embodiment of the present inventive concept. In the encoding 500, the same frame may be encoded to have Quad-High-Definition (QHD) resolution of 2560× 1440 pixels, which is a smaller size. At this time, since the original image is a UHD image, it may be impractical to directly encode it in QHD. Accordingly, as shown in FIG. 5, the encoder 330 may encode the original image by inputting an original source image as a sub-sampling of the UHD image. Here, in order to input the original source image to the encoder 330 as a sub-sampling, the encoder 330 may support sub-sampling encoding.

Moreover, the encoder 330 may encode in QHD by using only a specific pixel value corresponding to UHD/QHD among all of the samples in the UHD source image, as a source. In addition to the method described above, a pixel value represented by using a filter, such as a pixel average, may be used as a QHD source buffer for optimizing quality QHD encoding. In addition, pixel values used in QHD may be used for the remaining low resolution, such as but not limited to FHD encoding. In addition, the encoder 330 may perform down-sampling using FHD pixel values for SD encoding.

The video diversification device 301 according to an embodiment of the present inventive concept may recycle sub-sampled or down-sampled pixel values in order to perform real-time encoding for various resolutions.

Figure 6:
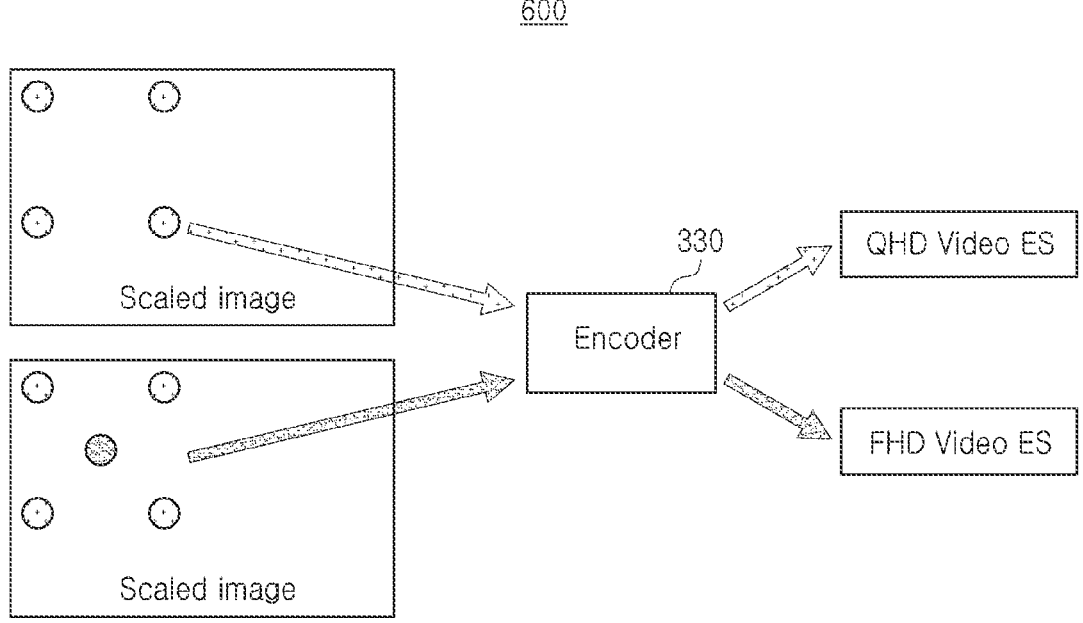
FIG. 6 is a block diagram illustrating encoding by down-sampling Quad-High-Definition (QHD) pixel values to Full-High-Definition (FHD) in an encoder according to an embodiment of the present inventive concept.

FIG. 6 illustrates encoding 600 by down-sampling QHD pixel values to FHD in the encoder 330 according to an embodiment of the present inventive concept. Referring to FIG. 6, first pixels may be QHD pixel positions of an original image, and second pixels may be calculated as a median value of the first pixels, a specific value, or a weight value to which a specific filter is applied. The encoder 330 may perform FHD encoding by inputting the median value, specific value, or weight value of these QHDs. As described above, by encoding the down-sampled pixel value by an input of the encoder 330 with one UHD source, the pixel value may be encoded to have each resolution. That is, the encoder 330 according to an embodiment of the present inventive concept may perform a multi-instance encoder function using one hardware encoder.

Figure 7:
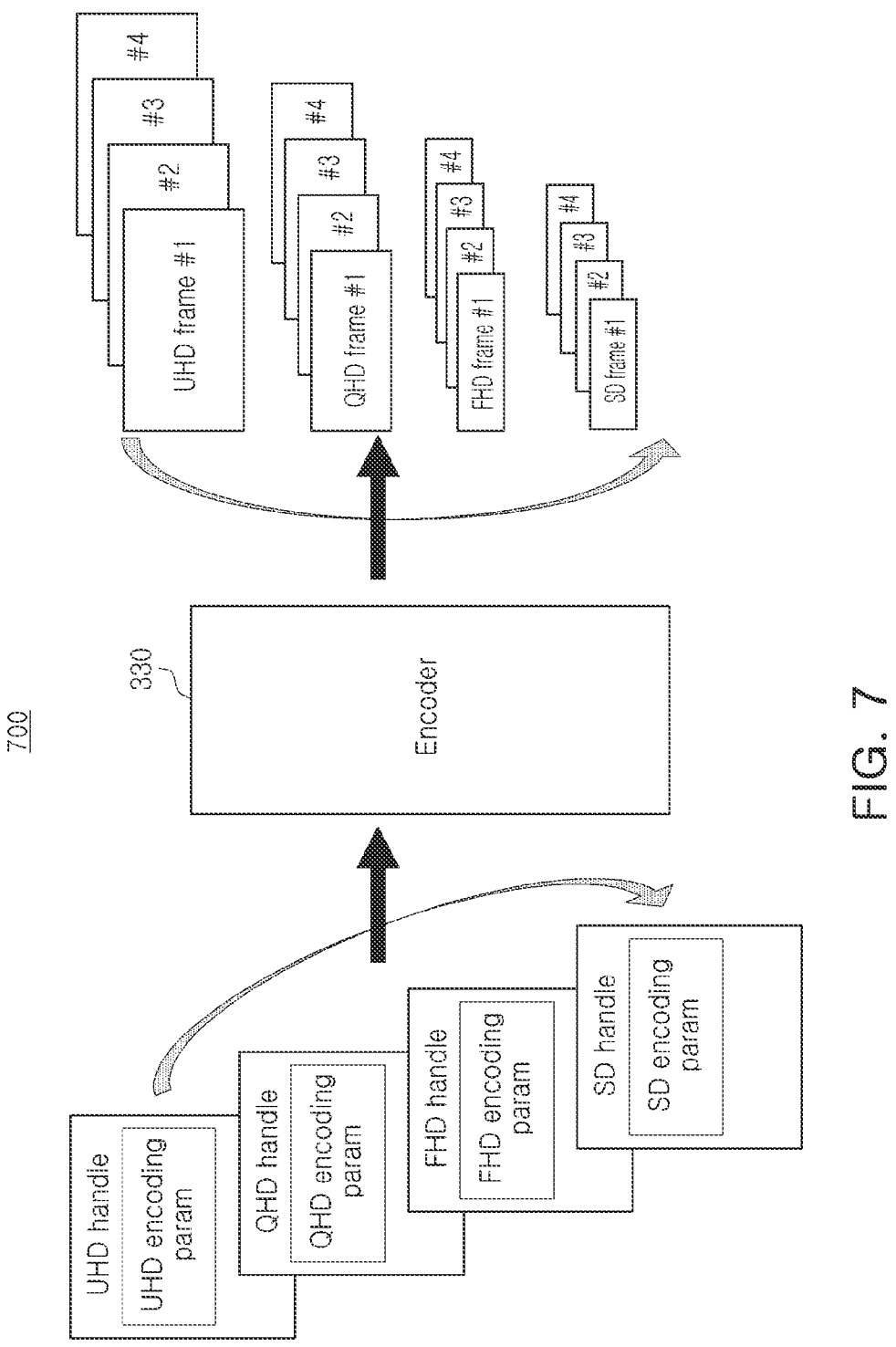
FIG. 7 is a block diagram illustrating encoding using multi-instance in a time-sharing manner in an encoder according to an embodiment of the present inventive concept.

FIG. 7 illustrates encoding 700 using multi-instance in a time-sharing manner in an encoder 330 according to an embodiment of the present inventive concept. Referring to FIG. 7, multi-instance encoding may be performed as follows.

First, information on how to perform down-sampling for a handle, excluding an encoding parameter and the highest resolution, may be maintained so that each resolution may be encoded. When encoding a first frame, UHD frame #1→QHD frame #1→FHD frame #1→SD frame #1 may be encoded sequentially. In addition, video ES, which is an encoding result, may be stored in a specific storage location.

When substantially all sequences of the first frame are completed, the capture unit 310 and the scaler 320 may provide a second frame as an input to the encoder 330. The encoder 330 may encode video ES for each resolution in the order of UHD frame #2→QHD frame #2→FHD frame #2→SD frame #2 for the second frame. Moreover, video ES of the second frame may be stored in each storage location.

As described above, when encoding of an n-th frame is completed in this manner, video ES having various resolutions may be completed in real-time. The video ES of each resolution stored thusly may be stored in the form of a stream in the internal storage of the video diversification device 301 to be delivered to the target device.

Figure 8:
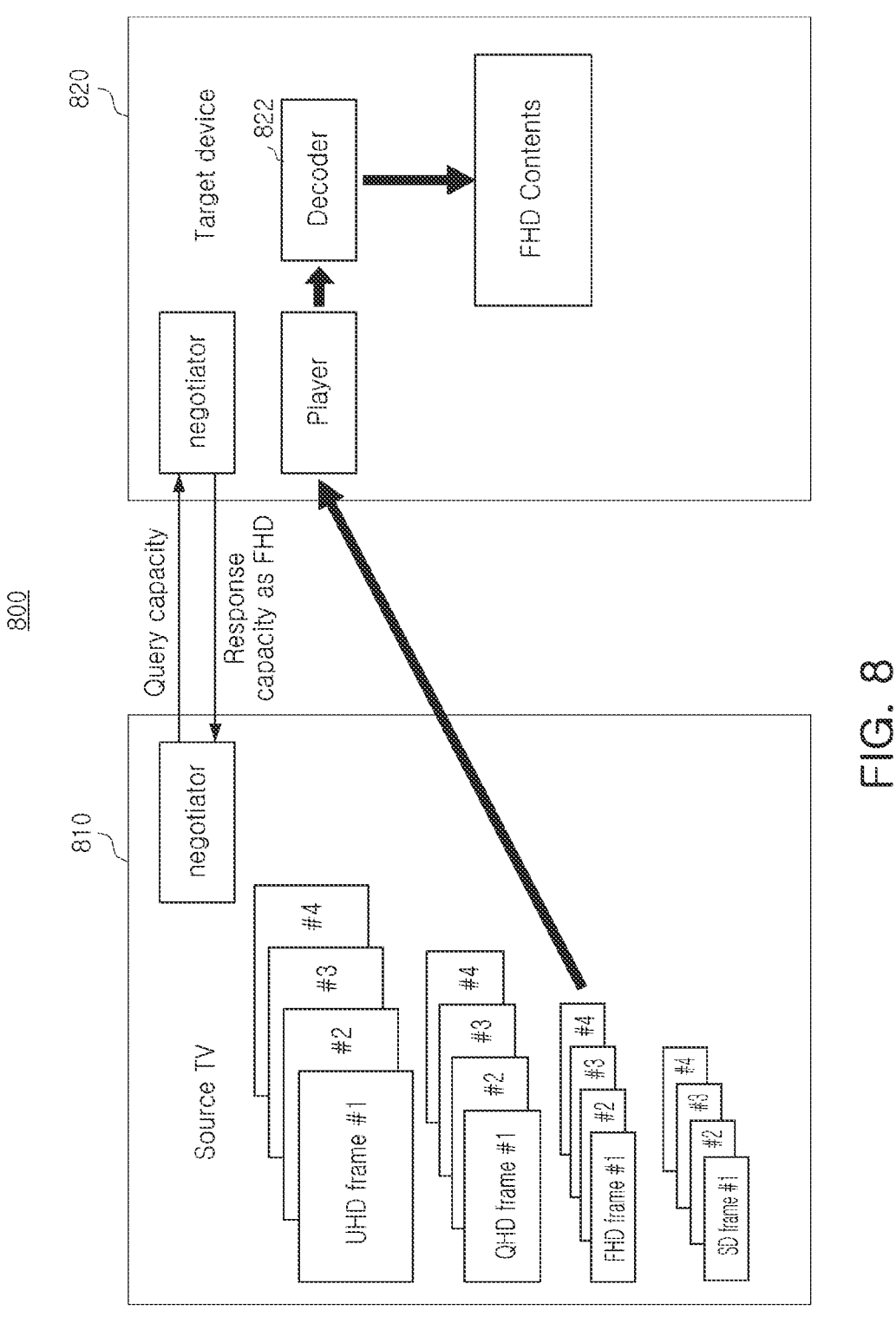
FIG. 8 is a block diagram illustrating a video service system according to an embodiment of the present inventive concept by way of example.

FIG. 8 illustrates a video service system 800 according to an embodiment of the present inventive concept. Referring to FIG. 8, the video service system 800 may include a video diversification device 810 and a target device 820.

Similar to that described in FIGS. 3 to 7, the video diversification device 810 may provide a service of internally stored video ES or video streams for each resolution as a required stream for the target device 820. For example, assuming that the target device 820 is a device capable of decoding only FHD streams, the video diversification device 810 may negotiate with a streaming or casting TV to provide FHD streaming to the target device 820. The target device 820 may output FHD content on the screen by decoding the provided FHD stream by the decoder 822.

Moreover, the video diversification device 810 according to an embodiment of the present inventive concept may enable adaptive streaming in real-time. For example, the target device has the capacity to decode up to UHD, but may receive UHD frames when the network environment is relatively high, and may receive low-resolution streaming to receive adaptive streaming in real-time when the network environment is relatively low.

Figure 9:
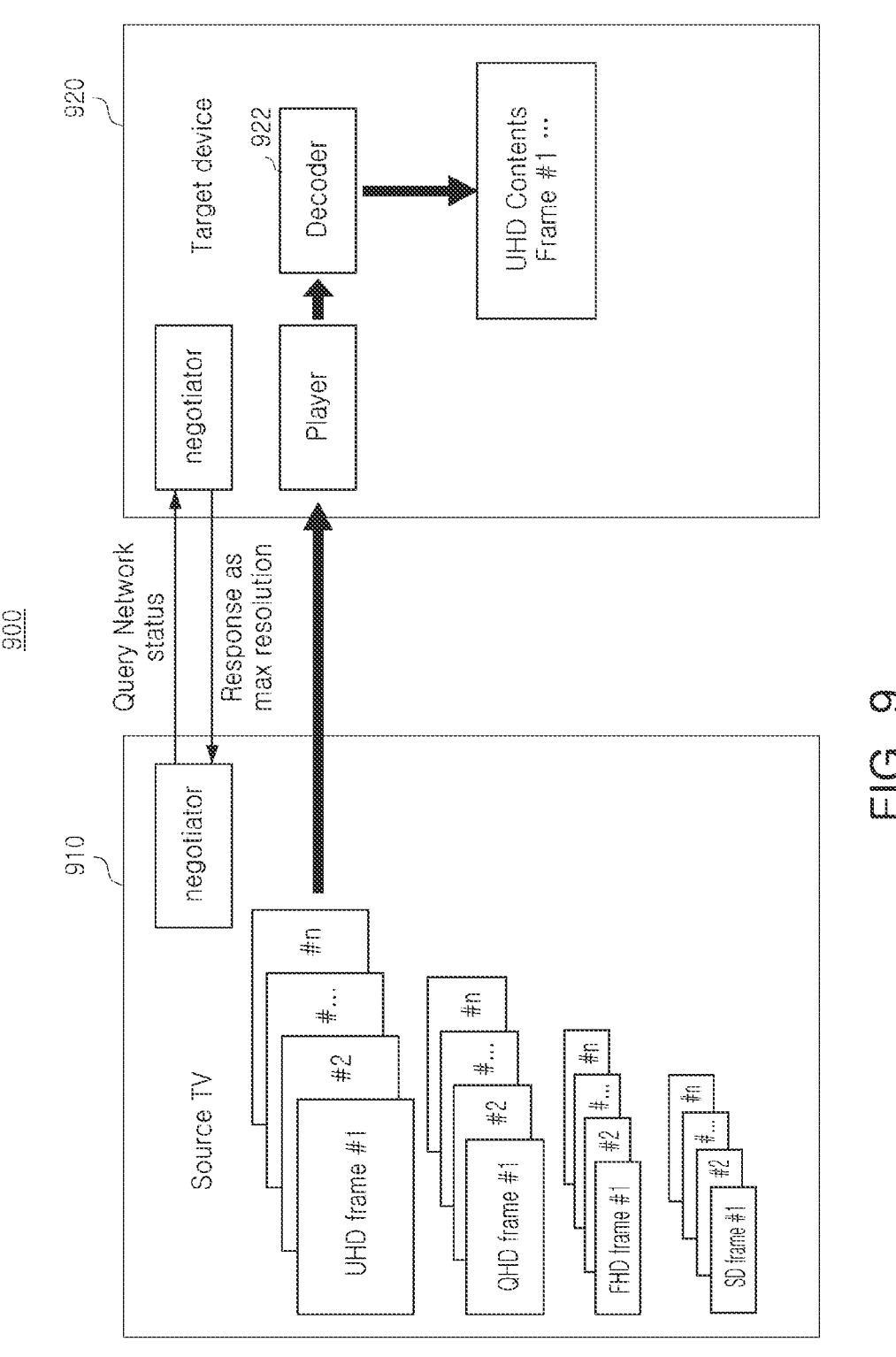
FIG. 9 is a block diagram illustrating that a video service system provides adaptive streaming according to the network environment according to an embodiment of the present inventive concept.

FIG. 9 illustrates that a video service system 900 provides adaptive streaming according to the network environment in accordance with an embodiment of the present inventive concept. Here, a target device 920 may decode up to UHD. As shown in FIG. 9, when the network environment is relatively high, the video diversification device 910 and the target device 920 of the video service system 900 may perform UHD streaming through negotiation.

Figure 10:
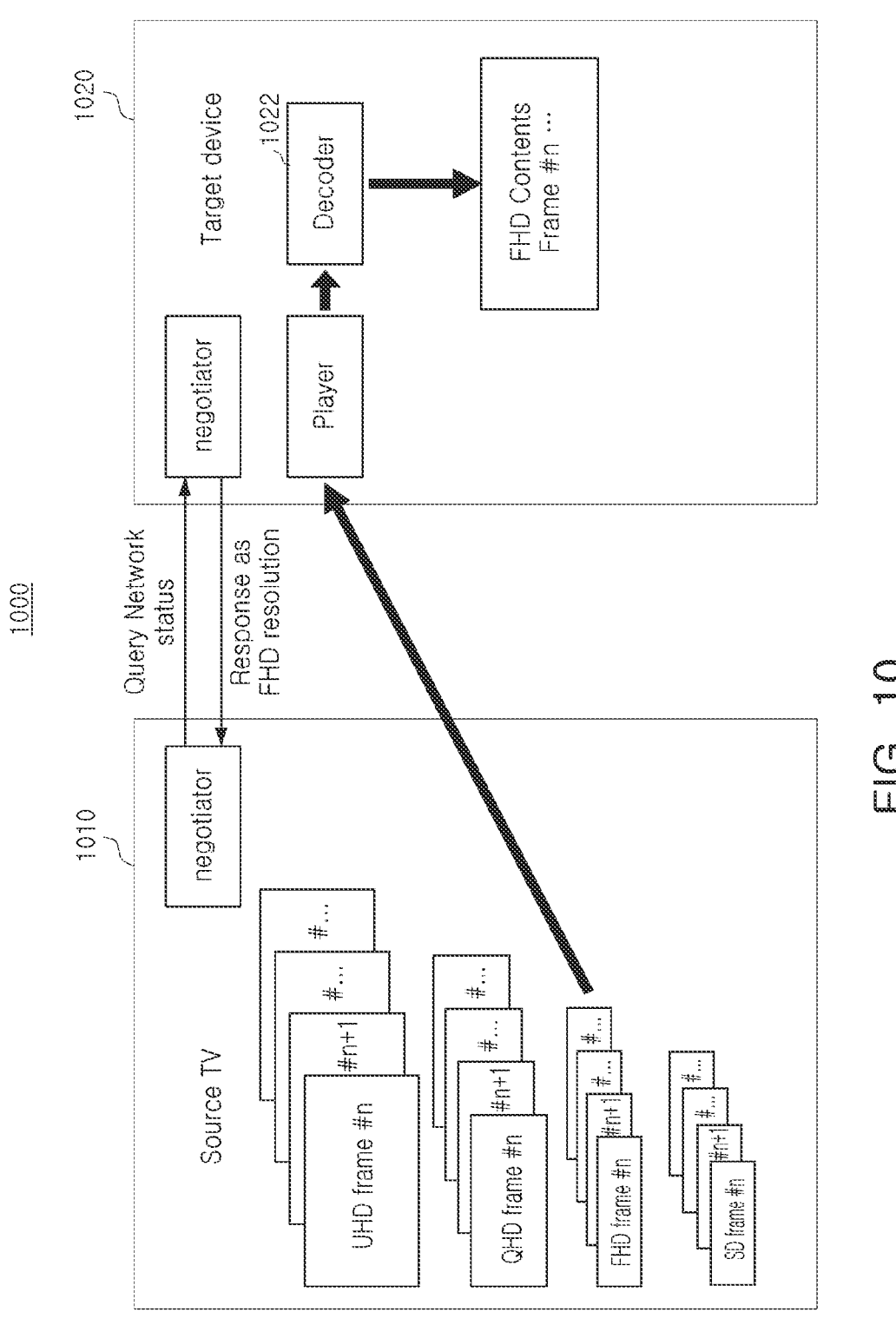
FIG. 10 is a block diagram illustrating that a video service system provides adaptive streaming according to the network environment according to an embodiment of the present inventive concept.

FIG. 10 is a view illustrating that adaptive streaming is provided according to the network environment in a video service system 1000 according to another embodiment of the present inventive concept. As shown in FIG. 10, when the network environment is relatively low non-optimal, the video service system 1000 may perform FHD streaming with a lower resolution than UHD. For example, when the network environment is relatively low, the target device 1020 may request the video diversification device 1010 to provide a service in FHD. The video diversification device 1010 may provide an FHD streaming service to the target device 1020 in response to the request from the target device 1020.

Figure 11:
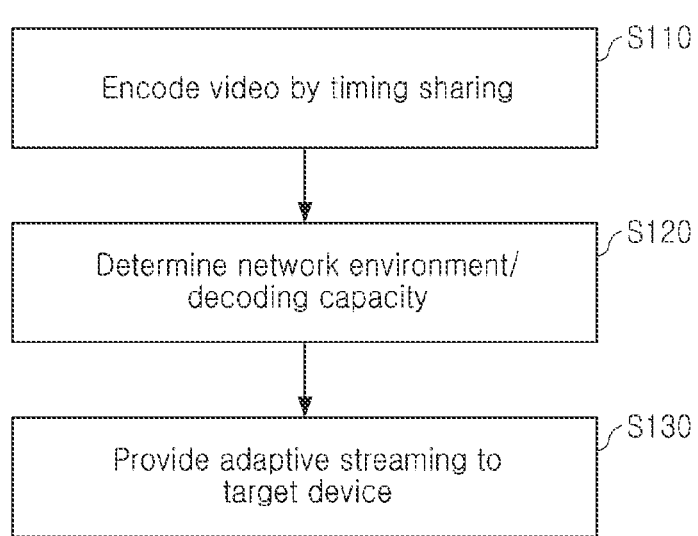
FIG. 11 is a flowchart diagram illustrating an operating method of a video diversification device according to an embodiment of the present inventive concept.

FIG. 11 illustrates an operating method 3100 of the video diversification device 810, 910 or 1010 according to an embodiment of the present inventive concept. Referring to FIGS. 3 to 11, an operation of the video diversification device 810, 910 or 1010 may be performed as follows.

The video diversification device 810, 910 or 1010 may encode original video into a video having multiple resolutions using a time-sharing manner (S110). The video diversification device 810, 910 or 1010 may determine the network environment or decoding capacity(or decoding performance) of the target device (S120). The video diversification device 810, 910 or 1010 may provide adaptive streaming at an optimized resolution to the target device according to the determined network environment and/or decoding capacity (S130).

In an embodiment, before encoding the video, the video diversification device 810, 910 or 1010 may capture a played screen and may scale the captured image to an image having the highest resolution among different resolutions. In an embodiment, the scaled image may be sub-sampled before an encoding operation. In an embodiment, before an encoding operation, the sub-sampled image may be sub-sampled again or down-sampled. In an embodiment, an average value of pixel values of the scaled image may be calculated before the encoding operation.

The devices described above may be implemented by hardware components, software components, and/or combinations of hardware components and software components. For example, devices and components described in an embodiment may be implemented using one or more general-purpose computers and/or special-purpose computers, such as a processor, a controller, an arithmetic logic unit (ALU), a digital signal processor, a microcomputer, a field programmable gate array (FPGA), a programmable logic unit (PLU), a microprocessor, and/or any other device capable of executing and responding to instructions. A processing device may run an operating system (OS) and one or more software applications running under the operating system. The processing device may also access, store, manipulate, process, and generate data in response to execution of software. For convenience of understanding, there may be cases in which one processing device is used, but those skilled in the art may understand that the processing device includes multiple processing elements or multiple types of processing elements. For example, the processing device may include multiple processors or a processor and a controller, without limitation thereto. Other processing configurations, such as parallel processors, are also possible.

Software may include a computer program, code, instructions, or combinations of one or more thereof, and may configure a processing device and/or or processes to operate as desired, or command the processing device independently or collectively. Software and/or data may be interpreted by a processing device or may be embodied in any type of machine, component, physical device, virtual equipment, computer storage medium or device as known in the art to provide instructions or data. Software may be distributed in computer systems connected by the network and stored or executed in a distributed manner. Software and data may be stored on one or more computer readable mediums.

Moreover, a target device according to an embodiment of the present inventive concept may be a display device.

Figure 12:
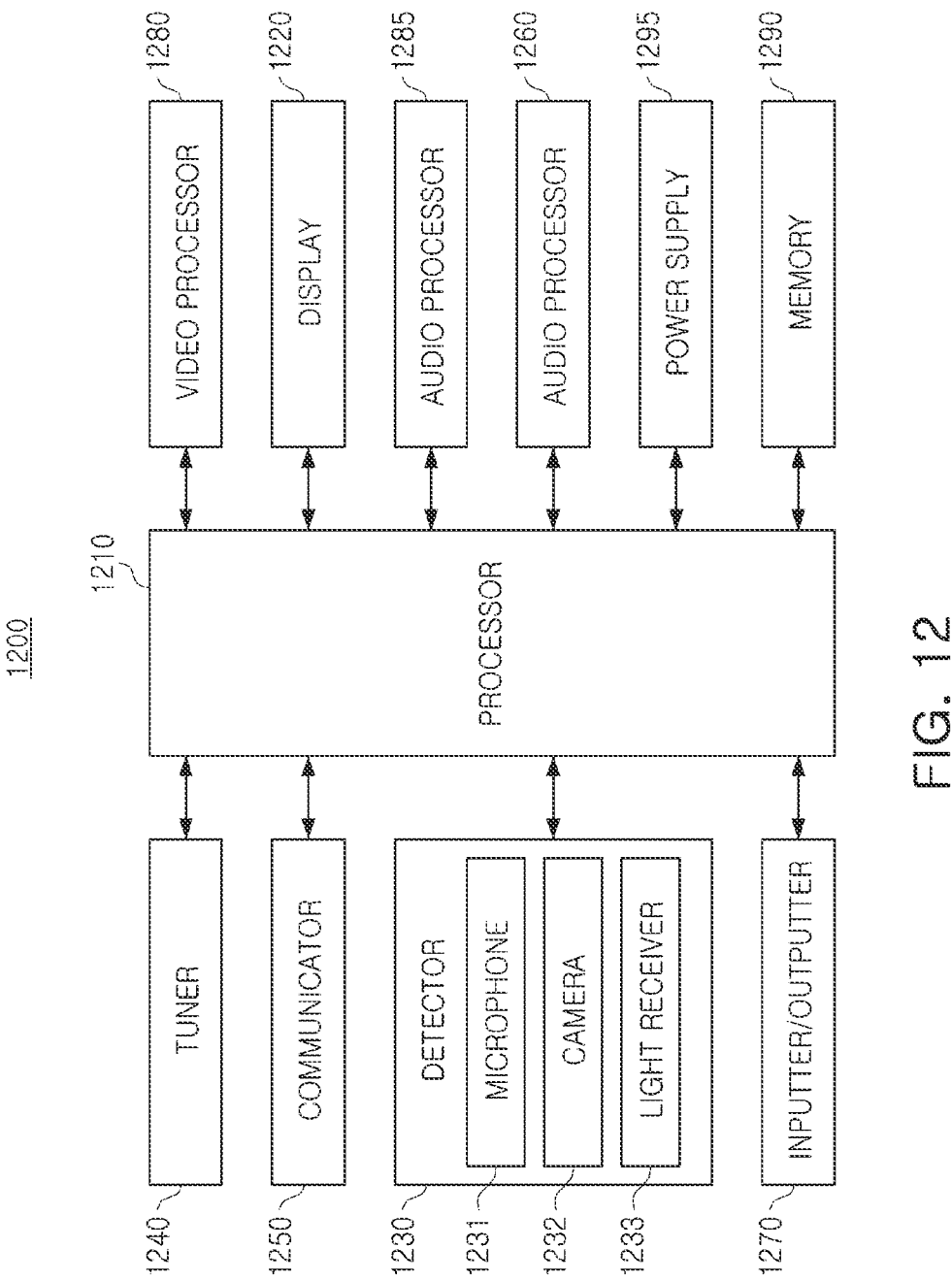
FIG. 12 is a block diagram illustrating a display device according to an embodiment of the present inventive concept.

FIG. 12 illustrates a display device according to an embodiment of the present inventive concept. Referring to FIG. 12, the display device 1200 may include a processor 1210, a display panel 1220, a communicator 1250, a detector 1230, a tuner 1240, an IO device 1270, a video processor 1280, an audio processor 1285, an audio output device 1260, a memory device 1290, and a power supply 1295.

The processor 1210 may be implemented to control an overall operation of the display device 1200 and signal flow between internal components of the display device 1200 and to process data. The processor 1210 may execute an operation system (OS) and various applications stored in the memory device 1290 when there is a user's input or when a pre-set and stored conditions are met.

The processor 1210 may store signals or data input from the outside of the display device 1200, RAM used as a storage region corresponding to various tasks performed in the display device 1200, and ROM and a processor storing a control program for controlling the display device 1200.

The tuner 1240 may tune and select a frequency of a channel to be received by the display device 1200 among many radio wave components through amplification, mixing, resonance, and the like, of a broadcast signal received by wire or wirelessly. The broadcast signal includes audio, video, and additional information (e.g., electronic program guide (EPG)). The tuner 1240 may receive broadcast signals from various sources, such as terrestrial broadcasting, cable broadcasting, satellite broadcasting, and Internet broadcasting. The tuner 1240 may receive a broadcast signal from a source, such as analog broadcasting or digital broadcasting.

The communicator 1250 may be implemented to transmit and receive data or signals to and from an external device or a server under the control of the processor 1210. The processor 1210 may transmit/receive content to/from an external device connected through the communicator 1250, download an application from the external device, or perform web browsing. Corresponding to the performance and structure of the display device 1200, the communicator 1250 may transmit/receive data or signals in at least one of a wireless Local Area Network (LAN) such as Wi-Fi™, a wireless Personal Area Network (PAN) such as Bluetooth®, and/or a wired network such as Ethernet, or the like.

The detector 1230 may detect a user's voice, a user's video, or a user's interaction, and may include a microphone 1231, a camera 1232, and a light receiver 1233. The microphone 1231 receives user's uttered voice. The microphone 1231 may convert the received voice into an electrical signal and output the same to the processor 1210. The user's voice may include, for example, a voice corresponding to a menu or function of the display device 1200. The camera 1232 may receive an image (e.g., continuous frames) corresponding to a user's motion including a gesture within a camera recognition range. The processor 1210 may select a menu displayed on the display device 1200 by using a recognition result of the received motion, or may control corresponding to the recognition result of the received motion. The light receiver 1233 receives an optical signal (including a control signal) received from an external control device through a light window of a bezel of the display panel 1220. The light receiver 1233 may receive an optical signal corresponding to a user input (e.g., touch, pressure, touch gesture, voice, or motion) from the control device. A control signal may be extracted from the received optical signal under the control of the processor 1210.

The video processor 1280 may be implemented to process video data received by the display device 1200. The video processor 1280 may perform various image processing, such as decoding, scaling, noise filtering, frame rate conversion, and resolution conversion on video data. In addition, the video processor 1280 may transmit a service resolution request to the video diversification device (or a server) for the adaptive streaming described above with reference to FIGS. 3 to 11.

The display panel 1220 converts an image signal, data signal, an OSD signal, a control signal, and the like, processed by the processor 1210 to generate a driving signal. The display panel 1220 may be implemented as a PDP, LCD, OLED, flexible display, or the like, and may also be implemented as a 3D display.

In addition, the display panel 1220 may be configured as a touchscreen and used as an input device in addition to an output device. The audio processor 1285 processes audio data. The audio processor 1285 may perform various processing, such as decoding or amplifying audio data and filtering noise. Moreover, the audio processor 1285 may include multiple audio processing modules to process audio corresponding to multiple contents. The audio output device 1260 outputs audio included in a broadcast signal received through the tuner 1240 under the control of the processor 1210. The audio output device 1260 may output audio (e.g., voice, sound) input through the communicator 1250 or the IO device 1270. In addition, the audio output device 1260 may output audio stored in the memory device 1290 under the control of the processor 1210. The audio output device 1260 may include at least one of a speaker, a headphone output terminal, or a Sony/Philips Digital Interface (S/PDIF) output terminal.

The power supply 1295 may be implemented to supply power input from an external power source to components inside the display device 1200 under the control of the processor 1210. In addition, the power supply 1295 may supply power output from at least one battery located inside the display device 1200 to internal components under the control of the processor 1210.

The memory device 1290 may be implemented to store various data, programs, or applications for driving and controlling the display device 1200 under the control of the processor 1210. The memory device 1290 may include a broadcast reception module, a channel control module, a volume control module, a communication control module, a voice recognition module, a motion recognition module, a light reception module, a display control module, an audio control module, an external input control module, a power control module, a power control module of an external device connected wirelessly (e.g., via Bluetooth®), a voice database (DB), an audio DB and/or a motion DB. The modules and databases of the memory device 1290 may be implemented in the form of software to perform a broadcast reception control function, a channel control function, a volume control function, a communication control function, a voice recognition function, a motion recognition function, a light reception control function, a display control function, an audio control function, an external input control function, a power control function, or a remote power control function of an external device connected wirelessly (e.g., via Bluetooth®). The processor 1210 may perform each function using the software stored in the memory device 1290.

Moreover, the display device 1200 may be integrated, added, or omitted according to specifications. That is, two or more components may be combined into one component, or one component may be subdivided into two or more components. In addition, the functions performed in each block are for explaining the illustrative embodiments described, and the specific operation or device does not limit the scope of the present inventive concept.

The present inventive concept may produce various outputs for the same contents with one H/W encoder. When a video conference is holding in a group by a general video diversification device, an image transmitted from a source device is transmitted to a target device, but the video of the target device is substantially the same. In contrast, in the present inventive concept, a bitrate or resolution and encoded output data may be different for each target device. In addition, in the present inventive concept, a hardware encoder of the source device may be one time-shared hardware encoder, without limitation thereto. For example, a source TV may register and use several encoder devices instead of one.

The video diversification device, the video service system including the same, and the operating method thereof according to an embodiment of the present inventive concept may provide an adaptive streaming service having a real-time function according to device characteristics and/or the network environment by performing multi-instance encoding on an image displayed on a TV.

The video diversification device, the video service system including the same, and the operating method thereof according to an embodiment of the present inventive concept may capture the largest image displayed on a TV and encode it into a video having various resolutions, and provide an adaptive streaming service according to device characteristics and/or the network environment.

The video diversification device, the video service system including the same, and the operating method thereof according to an embodiment of the present inventive concept may provide mirroring, casting, and a video call function with various resolutions for a source according to device characteristics and/or the network environment.

The video diversification device, the video service system including the same, and the operating method thereof according to an embodiment of the present inventive concept may encode with one TV source, but may provide an adaptive streaming service suitable for each environment of the devices.

While illustrative embodiments have been shown and described above, it will be apparent to those of ordinary skill in the pertinent art that various modifications and variations may be made without departing from the scope and spirit of the present inventive concept as defined by the appended claims.

What is claimed is:

1. A video diversification device comprising:
   a capture unit configured to capture each image of a video being played;
   a scaler configured to scale each captured image into an image with a first resolution; and
   an encoder configured to convert one of the scaled images into an encoding source with the first resolution in a first of a plurality of time slots and to sequentially convert said scaled image into one or more encoding sources with each different successively decreasing resolution in each other of the plurality of time slots, respectively.

2. The video diversification device of claim 1, wherein:
the first resolution is an Ultra High-Definition (UHD) resolution,
the converted encoding sources have different resolutions including at least two of the UHD resolution, a Quad-High-Definition (QHD) resolution, a Full-High-Definition (FHD) resolution, a High-Definition (HD) resolution, and a Standard-Definition (SD) resolution.

3. The video diversification device of claim 1, wherein:
the encoder converts the scaled image into an encoding source with a second resolution lower than the first resolution by sub-sampling the scaled image.

4. The video diversification device of claim 3, wherein the encoder down-samples the sub-sampled image to convert the scaled image into an encoding source with a third resolution lower than the second resolution.

5. The video diversification device of claim 3, further comprising a buffer memory storing the sub-sampled image.

6. The video diversification device of claim 1, wherein the encoder filters and converts pixel values of the scaled image into an encoding source with a second resolution lower than the first resolution.

7. The video diversification device of claim 1, wherein the encoder is further configured to perform encoding sequentially in order of decreasing resolution.

8. The video diversification device of claim 1, further comprising a buffer memory configured to store each of the encoded sources in a stream format.

9. The video diversification device of claim 8, wherein adaptive streaming is provided to one of the converted encoding sources according to a network environment with a target device or a decoding performance of the target device.

10. The video diversification device of claim 8, wherein adaptive streaming is provided to one of the converted encoding sources in response to a service resolution request to a target device.

11. A video service system comprising:
at least one target device; and
a video diversification device configured to provide adaptive streaming to the at least one target device according to at least one of a network environment or a decoding performance of the at least one target device,
wherein the video diversification device includes an encoder configured to encode an original source into an encoding source with a plurality of time slots and to sequentially encode a scaled image into one or more encoding sources with each different successively decreasing resolution in each other of the plurality of time slots, respectively.

12. The video service system of claim 11, wherein the at least one target device and the video diversification device determine the adaptive streaming according to negotiation.

13. The video service system of claim 11, wherein each of the converted encoding sources has one of resolutions including Ultra High-Definition (UHD), Quad-High-Definition (QHD), Full-High-Definition (FHD), High-Definition (HD),and Standard-Definition (SD).

14. The video service system of claim 11, wherein the video diversification device further includes a buffer memory configured to store the converted encoding sources.

15. The video service system of claim 11, wherein the video diversification device receives a service resolution request from the at least one target device, and provides the adaptive streaming to the at least one target device using one of the converted encoding sources according to the service resolution request.

\*    \*    \*    \*    \*